United States Patent [19]

Smith

[11] 4,272,469

[45] Jun. 9, 1981

[54] METHOD AND APPARATUS FOR FORMING EXPANDED FOAM ARTICLES

[75] Inventor: Stuart B. Smith, Conyers, Ga.

[73] Assignee: Integrated Insulation Systems, Inc., Decatur, Ga.

[21] Appl. No.: 59,392

[22] Filed: Jul. 20, 1979

Related U.S. Application Data

[63] Continuation-in-part of Ser. No. 15,431, Feb. 26, 1979, abandoned, which is a continuation-in-part of Ser. No. 899,997, Apr. 25, 1978, abandoned, and a continuation-in-part of Ser. No. 8,688, Jan. 30, 1979, abandoned.

[51] Int. Cl.³ .............................................. B29D 27/00
[52] U.S. Cl. ...................................... 264/53; 264/101; 264/DIG. 9; 425/4 R
[58] Field of Search ............. 264/53, 51, 101, DIG. 9; 425/4 R

[56] References Cited

U.S. PATENT DOCUMENTS

| | | | |
|---|---|---|---|
| 3,015,851 | 1/1962 | Wiles | 264/53 |
| 3,086,248 | 4/1963 | Culp | 264/101 X |
| 3,235,908 | 2/1966 | Thompson | 264/51 X |
| 3,236,927 | 2/1966 | Thompson | 264/51 |
| 3,257,103 | 6/1966 | Brockhues et al. | 264/DIG. 9 |
| 3,278,658 | 10/1966 | Immel | 264/51 |
| 3,577,360 | 5/1971 | Immel | 264/53 |
| 4,032,609 | 6/1977 | Smith | 264/53 |
| 4,060,354 | 11/1977 | Smith | 425/4 R |

Primary Examiner—Philip Anderson
Attorney, Agent, or Firm—Bert J. Lewen

[57] ABSTRACT

A method and apparatus for forming foam articles is described. Thermoplastic resin beads containing a blowing agent are continually agitated in a heated pre-expansion chamber to a temperature near the fusion point of the beads and above the boiling point of the blowing agent at substantially atmospheric pressure. The beads soften and expand substantially in volume. A dry gaseous medium may be swept over the beads to remove moisture and any blowing agent which has escaped. Thereafter, the chamber is evacuated. Evacuation continues until a predetermined amount of blowing agent is removed from the beads. As a preferred embodiment of the invention, steam may be injected into the chamber prior to evacuation. This serves to further expand the beads, and facilitates the removal of the blowing agent. This embodiment also provides a means of manufacturing particularly stable low-density foam. The expanded beads, after they are restored to atmospheric pressure, are discharged to a storage facility and maintained at an elevated temperature for immediate use in a molding apparatus. The expanded hot beads may be fed directly by air injection conveyors to mold cavities and molded into the desired articles.

13 Claims, 1 Drawing Figure

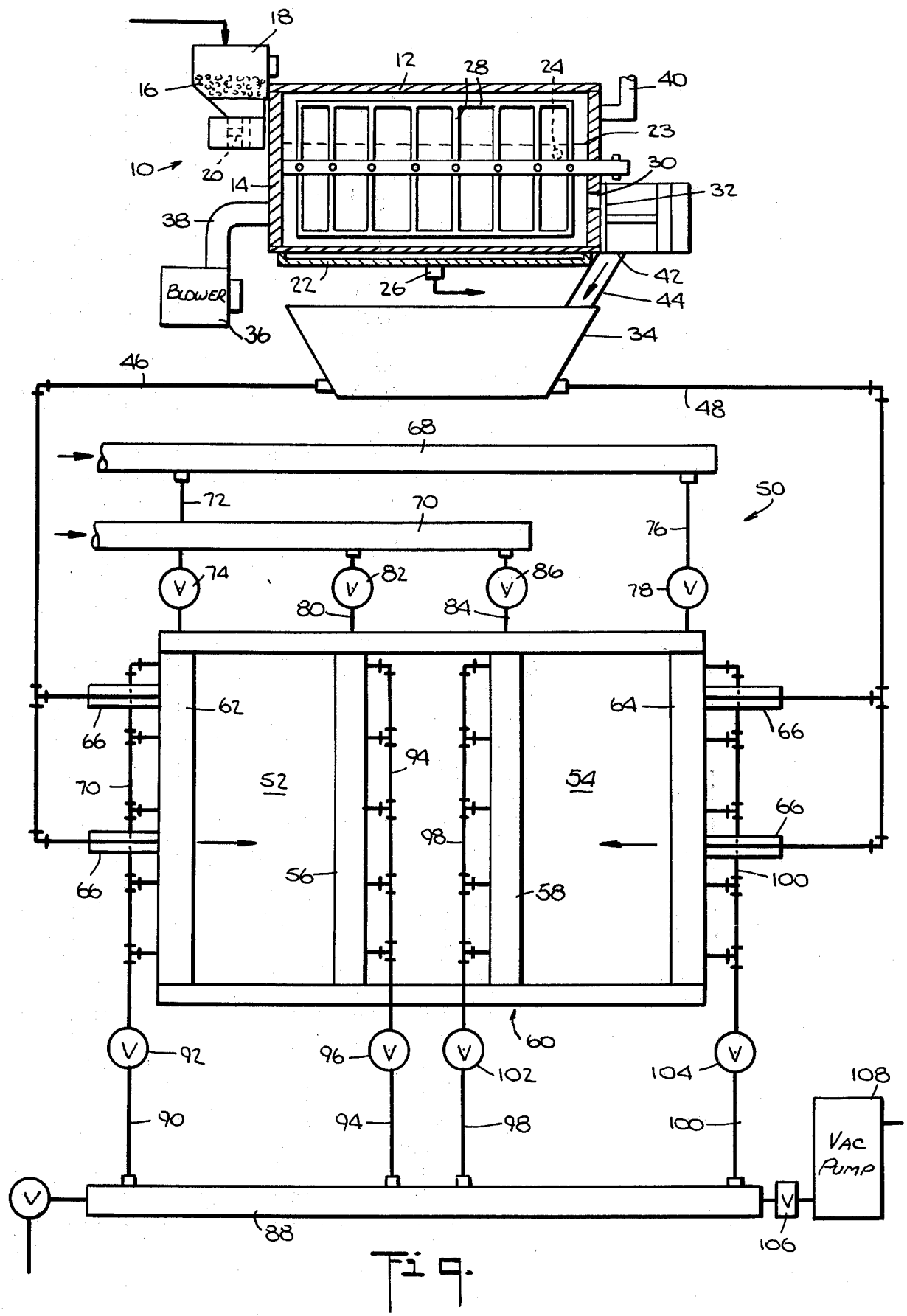
Fig.

METHOD AND APPARATUS FOR FORMING EXPANDED FOAM ARTICLES

RELATED APPLICATIONS

This application is a continuation-in-part of co-pending U.S. patent application Ser. No. 15,431, filed Feb. 26, 1979, and now abandoned, which, in turn, is a continuation-in-part of U.S. patent application Ser. No. 899,997, filed Apr. 25, 1978 and now abandoned; and a continuation-in-part of co-pending U.S. patent application Ser. No. 8,688, filed Jan. 30, 1979 and now abandoned.

BACKGROUND OF THE INVENTION

The present invention relates to expanded foam articles from synthetic thermoplastic materials and particularly to pre-expanding beads of such thermoplastic materials for use in subsequent molding processes.

In the process of the prior art, it is conventional to initially pre-expand the thermoplastic beads to form so-called "pre-puffs." These pre-puffs are expanded to at least fifty percent of volume of the final molded article. By preforming the beads, the mold can be substantially filled, thereby permitting a more uniform expansion of the beads, the elimination of voids, lower molding pressures, higher production cycles, and the formation of low density foam. The basic process is described by G. R. Franson, *Plastics Technology*, July, 1956, pp. 452–455.

Many pre-expansion techniques have been developed. Initially, the particular technique was not considered important, perhaps because production rates were less critical. Accordingly, U.S. Pat. No. 3,015,851 simply stated that one could use hot water, steam, dielectric heating, infra-red radiation or hot air. For economic reasons, steam was regarded as the heating medium of choice as noted in U.S. Pat. No. 3,086,248, but later direct steam heating fell into disfavor because the residual moisture had to be removed prior to molding to prevent irregular expansion and the crushing of the beads. Often, a storage period of 24 hours was required to normalize the pre-puffs prior to molding.

U.S. Pat. No. 3,252,228 turned to pre-expanding in a moisture-free atmosphere; however, these techniques, too, were not without their problems. Free flowing, uniform pre-puffs became more imperative as still higher production rates were demanded. The aforesaid U.S. Pat. No. 3,252,228 and U.S. Pat. No. 3,821,342 show exotic means of fluidizing the pre-puffs to obtain uniformity and dry free-flowing particles. U.S. Pat. No. 3,577,360 shows the use of an agitator to keep the particles moving to prevent agglomeration.

As the art progressed, it was recognized that appropriate pre-expansion was an art far more complex than originally understood. Boiling the beads in hot water for an arbitrary period or merely heating them in hot air or steam until some predetermined density was achieved was not sufficient for producing uniform, dimensionally stable products at ever faster production rates. It was soon recognized that the type of polymer, the volatile content of the bead before and after pre-expansion, and the moisture in the environment must all be considered. And finally, the equipment for pre-expanding and molding the foam has to be capable of high speed and trouble-free operation.

In addition to the patents noted above, pre-expansion is shown in U.S. Pat. Nos. 2,944,292 and 3,494,600 (hot water); U.S. Pat. Nos. 3,139,272 and 3,973,884 (steam); U.S. Pat. Nos. 3,273,873; 3,278,658; 4,032,609 and 4,060,354 (dry air); U.S. Pat. Nos. 3,023,175 and 3,378,245 (steam and hot air); U.S. Pat. Nos. 3,104,424 (radio frequency); and U.S. Pat. No. 3,262,682 (conduction).

U.S. Pat. No. 3,577,360 shows a process for pre-expansion wherein the beads are first heated in a closed vessel and then evacuated to pre-expand and remove a substantial amount of the blowing agent. It is disclosed that the atmosphere should be substantially dry. No details of molding are shown and water is added as a coolant. This process, however, does not produce stable pre-puffs and requires prolonged evacuation periods.

BRIEF SUMMARY OF THE INVENTION

The subject invention relates to a method and apparatus for pre-expanding thermoplastic materials containing a blowing agent. More specifically, the invention teaches a means of pre-expansion which forms dimensionally stable "pre-puffs" which may be molded directly to their final dimensions without further finishing. The method and apparatus of the present invention overcome a number of the foregoing disadvantages and provide a process which will produce a finished product in substantially less time than has heretofore been possible. Moreover, the method and apparatus of the present invention will result in the production of a product that will be substantially more uniform in terms of its density and structural integrity and which can be manufactured at lower cost and with less capital expenditure as compared with the methods and apparatus of the prior art.

In brief compass, thermoplastic beads, e.g. polystyrene beads, containing a blowing agent, e.g. pentane, are pre-expanded by first heating by conduction a measured amount of agitated beads to their softening point in a vessel maintained at substantially atmospheric pressure. Heating is continued and controlled until the beads expand to a predetermined degree. A gaseous medium, e.g. air, may be swept through the chamber to remove any blowing agent which has been liberated from the bead to avoid any potential safety hazards. Thereafter, the vessel is closed and evacuated to substantially reduce the blowing agent content of the beads. When the blowing agent is reduced to the appropriate amount, the vessel is returned to atmospheric pressure.

The beads may then be transferred directly to a mold cavity. Alternatively, they may be returned to atmospheric pressure in a storage container which maintains the partially expanded beads at an elevated temperature. By maintaining the pre-puffs at an elevated temperature, it has been found that the subsequent molding process can be carried out much more rapidly and with a lower overall energy consumption.

From the pre-expansion chamber, or heated storage container, as the case may be, the pre-puffs are injected into a preheated mold cavity or cavities by conventional air-operated fill guns. A number of fill guns are employed to carry out as rapidly as possible the filling of the mold cavity. Also, the mold cavities may be constantly subject to a vacuum from a suction pump to facilitate the rapid filling of the mold cavities.

When the filling is completed, a vacuum suction is applied through one face of the mold cavity while a heating fluid such as superheated steam or hot air is passed through the other face of the mold cavity for a period of time. Then, the direction of flow of the heating medium is reversed through the mold cavity to assure uniform heating and expansion of the pre-puffs to fuse the product. The residual blowing agent in the pre-puff makes possible the expansion during the higher molding temperatures and is necessary for complete fusion.

Upon completion of the expansion and fusion of the pre-puffs, the flow of the heating fluid is discontinued and, for a brief interval, a negative pressure is maintained to remove substantially all of the moisture and blowing agent. This will also assist in forming a skin on the molded article, which can also be accomplished by cooling the mold surfaces. Thereafter, the interiors of the cavities are returned to atmospheric pressure and the cavities opened to effect automatic ejection of the finished article.

In a preferred embodiment of the invention, the prepuff is further expanded in the pre-expansion step by the injection of steam into the vessel after the initial heating. This technique serves to further soften the pre-puff and facilitate the migration of the blowing agent out of the pre-puff. This embodiment shortens the period of evacuation necessary to eliminate substantially all of the blowing agent and permits the formation of stable pre-puffs of exceptionally low density.

The process of the present invention not only eliminates down time and curing between the pre-expansion step and the molding step, but also eliminates the requirement for post-molding conditioning of the finished article so that the product can be packaged and shipped to a customer directly from the molding apparatus.

Without being bound to any particular theory, it is believed that the unique success of the invention may be best understood by considering the effect of each of the inventive process steps on the thermoplastic particles. Initially, during the preheating stage, the bead is tumbled with agitation against the hot walls of the pre-expander in a dry atmosphere. The bead is heated uniformly throughout and allowed to expand freely as the blowing agent volatilizes. Because the pre-expander is not closed, as in U.S. Pat. No. 3,577,360, or later subjected to superatmospheric pressure, as in U.S. Pat. No. 4,032,609, the expansion is not retarded. During this stage, the density of the pre-puff may be controlled by varying the temperature of the bead. While in all cases the bead is softened to some degree, at the higher range of temperature it becomes more fluid and greater expansion occurs. Because the bead temperature (and therefore the pre-puff density) can be easily regulated for each batch loaded into the pre-expander merely by controlling the jacket temperature and the heating period, a wide range of products can be made.

Two other advantages are obtained in the preheating step of the invention. Firstly, because the beads are heated by conduction with the walls of the pre-expander, the surface softens to a greater extent than the interior, thereby forming, upon cooling, a dense skin or crust around the particle. This lends dimensional stability to the pre-puff. Steam does not have this effect because it permeates the pre-puff. Secondly, by pre-heating under atmospheric pressure, the escape of the volatilized blowing agent is not retarded.

After the expansion is completed in the preheating stage, the vacuum applied to the pre-puff serves to reduce the blowing agent concentration to a minimum amount. Naturally, less time is required for this step because a substantial amount of the blowing agent has been eliminated during the preheating. The elimination of the blowing agent is a key factor in obtaining a dimensionally stable product. The pre-puff, however, must still contain a minimum amount because it is needed to further expand the product during the final molding.

In the preferred embodiment of the invention, to facilitate the reduction of blowing agent concentration and the molding process, a small amount of high temperature steam is injected at the end of the pre-heating period. This rapidly heats and further expands the pre-puff. Not only does this reduce the density of the pre-puff, but it also increases the permeability of the surface skin, thereby reducing the time and energy required to extract the blowing agent from the pre-puff during the evacuation stage. Heating and the evacuation of volatiles during the molding step are also facilitated.

In the process of the invention, the mold is entirely filled with the pre-puff. During the molding step, therefore, there is little change in the bulk density of the mass. In fact, however, the individual pre-puffs do further expand to fill the voids between the particles. It is for this reason that a small amount of blowing agent must remain. Without it, no further expansion would occur under the molding conditions and fusion would only occur at the points where the spherical particles touch. On the other hand, once molding is complete, substantially all of the blowing agent must be removed. To do this and to fuse the particles, steam is passed alternatively from one side of the mold while the mold is placed under vacuum from the other side. The final evacuation step also insures substantially complete removal of the blowing agent and moisture. If both were not removed, the cooling time required before the molded article could be removed from the mold would be lengthened (because of the high specific heat of the water and the pressure developed by the blowing agent) and dimensional stability lost.

In summary, it is apparent that the process of the invention is effective because its unique combination of steps serves to quickly remove the blowing agent and moisture, once their purposes have been served, to produce an outstanding product hitherto unobtainable and especially at high production rates.

BRIEF DESCRIPTION OF THE DRAWING

The FIGURE is a schematic illustration of the pre-expansion and molding apparatus and method of the present invention.

DETAILED DESCRIPTION OF THE INVENTION

Referring to the FIGURE, there is illustrated a pre-expansion apparatus, generally designated at 10, which includes a cylindrical container 12, the axis of which extends generally horizontally. The container 12 has in its end wall 14 an opening for receiving unexpanded synthetic, thermoplastic resin material in the form of beads 16. The most widely used type of material is polystyrene containing n-pentane as the blowing agent. It has a density of about 40 lbs./sq.ft. and the conditions described hereinafter are those used for such material. The beads 16 are first deposited in a feed hopper 18. The desired quantity of beads 16 are then fed to the interior of the container 12 by a charging piston 20 which may be air-actuated.

The interior wall of the container 12 is heated to a temperature of from about 225° to 250° F. by a heating fluid which is circulated through a heating jacket 22 which surrounds a major portion of the exterior of the container 12. Heating fluid is introduced through the inlet 24 located adjacent the upper edge 23 of the heating jacket, on one side of the container 12, and is removed through the outlet 26 located at the bottom of the jacket from whence the fluid is removed.

Means are provided for agitating the beads in the container 12 in the form of a plurality of spokes 28 mounted on a rotating rod which is driven by a motor, not shown. The agitation prevents the agglomeration of the beads and facilitates uniform heating.

Whereas the inlet adjacent the charging piston 20 is located above the central axis of the container 12, the outlet 30 is disposed vertically below the central axis so that, when the discharge piston 32 is actuated to open the outlet 30, the expanded beads will flow under the influence of gravity to a storage container 34. This transfer may be accelerated by blowing the pre-puffs out of the container 12 with air from the blower 36.

With the charging piston 20 loaded with the appropriate quantity of beads 16, the walls of the container 12 are heated to the appropriate expansion temperature. This is a temperature sufficient to soften the surface of the beads and to volatilize the blowing agent, but not sufficient to cause fusion between the beads during agitation. The degree of softening of the bead and the period of preheating are dependent on the density of the pre-puff and finished product desired. As is well known to those skilled in the art, the more the bead is softened, the greater the expansion and the less the density of the pre-puff. For example, using a feed of 45 pounds of polystyrene beads containing 7% of pentane as the blowing agent, if one is seeking to produce a finished product having a density of 6 lb./cu.ft., the steam entering the heating jacket should be set for 225° F. and the pre-heat period be 70 seconds. On the other hand, if a 1.6 lb./cu.ft. product is desired, the temperature of the steam to the heating jacket should be set at 250° F. with a 70 second pre-heat time period. By doubling the pre-heat time to 140 seconds, at 250° F. steam temperature, the density can be reduced to 1.25. One skilled in the art may readily determine the appropriate combination of temperature and time for the pre-heat step, by considering the type of thermoplastic bead, the weight of the charge, the equipment and the desired density. The charging cylinder 20 is operated to load the beads into the interior of the container 12 while the agitator bars 28 are rotated to continually bring the beads into contact with the heated surface of the container 12.

Hot air from a source 36 may be introduced preferably at a temperature above the softening point of the beads through conduit 38 and wall 14 into the interior of the container 12. A strong current of hot air is maintained in the chamber 12 by drawing out the atmosphere in the container through a conduit 40 which is connected to a vacuum pump. Thus, the interior of the container will be maintained at or very near atmospheric pressure, and any vapor or gases that are evolved during the expansion of the beads will be quickly removed. The latter is important since it aids in the removal of the pentane from the bead and serves as a safety consideration since the pentane gas evolved and released into the atmosphere of the container is highly explosive when mixed with oxygen. Moreover, where the incoming beads carry moisture as a result of long periods of storage or any pre-processing cleaning steps, it is important that the moisture be removed so that the expansion of all of the beads will proceed at a fairly uniform rate.

In those instances where a particularly low density foam or higher production rates are desired, a measured amount of high temperature steam may be introduced through a plurality of inlet lines (not shown) in the bottom of the container 12 after the initial expansion of the beads with the dry air. This steam is at a temperature greater than that of the pre-puff, e.g. from 212° to 350° F., and releases latent heat of condensation on the polystyrene particles. This serves to rapidly increase the temperature of the particles and provide additional expansion. This step, too, is performed at or near atmospheric pressure. Only a limited amount of condensate is formed during this step because the bulk of the heat provided to the beads is added by convection during the preheating step. This condensation is completely removed through a plurality of outlet ports (not shown) on the top and side of the container 12 during the evacuation step described below. The use of a plurality of steam inlet and outlet ports assures even distribution of the steam through the agitating beads.

When the expanded beads or pre-puffs reach the desired density, the pressure in chamber 12 is lowered to subatmospheric pressure (from 2" to 25" Hg vacuum, preferably 10" to 20" Hg) by actuation of the vacuum pump through line 40. By lowering the pressure at this stage the residual gas in the pre-puffs can be reduced to give the pre-puffs excellent stability. This vacuum step removes the majority of the blowing agent (and condensate, where steam addition is used), while leaving an amount just sufficient to permit further expansion of the beads during the molding step. Preferably, where the polystyrene beads originally have about 5% to 7% by weight of the blowing agent, the vacuum step reduces the level from 0.75% to 2% by weight, preferably to about 1%, of gas remaining. By using the preferred embodiment of the invention, i.e. steam addition after preheating, the evacuation of the blowing agent is facilitated. It is believed that this is because the skin becomes more permeable to the gases.

After the vacuum step, the discharge piston is actuated to rapidly effect dumping of the pre-puffs into the insulated storage container 34, maintained at atmospheric pressure and a temperature of from 120° to 170° F. From the storage container 34, the partially expanded beads are pneumatically fed through conduits 46 and 48 to a molding apparatus generally designated at 50.

Alternately, the outlet 42 may be directly coupled to a tubular conduit to effect rapid discharge of the container 12 and immediate loading of a mold cavity, as described below. In such event, the pre-puffs must be restored to atmospheric pressure prior to loading the mold cavity.

As described in more detail below, pressurized air actuated fill guns are employed to inject the pre-puff into a pair of identical mold cavities 52 and 54 which are schematically illustrated in the FIGURE.

The molding apparatus 50 includes mold platens 56 and 58 which are fixedly mounted on frame means generally designated at 60. In addition, a mold platen 62 is movably mounted on frame means 60 opposite mold platen 56 and identical mold platen 64 is movably mounted on frame means 60 opposite mold platen 58. As described in detail below, each of the mold platens 56, 58, 62 and 64 includes a number of perforations therethrough, some of which are for the purpose of admitting pre-puff from the fill gun 66 and others of which are for admitting a heating fluid and for evacuation of the interior of each of the mold cavities.

The mold platens 62 and 64 are movable towards and away from their facing counterparts. With this arrangement, molded articles such as insulation board can be produced with a wide range of thicknesses and shapes simply by varying the size of the mold cavities 52 and 54 as well as the configuration of the mold faces themselves.

The fluid handling system of the molding apparatus 50 will now be described in conjunction with the FIGURE.

In the preferred method, a heated fluid medium such as hot air is supplied to two separate plenum chambers 68 and 70 which are appropriately located close to the molding apparatus 50. While hot air may be used as the heated fluid medium, superheated steam at a temperature of from 200° to 275° F. is preferred. From plenum chamber 68, the heated medium is supplied through one or more conduits 72 to a plenum chamber (not shown) located behind the face of mold platen 62. A magnetically operated valve, movable between an open and closed position, controls the flow of the fluid medium through conduit 72. Similarly, one or more conduits 76 controlled by a similar valve 78 supplies the fluid medium to the plenum chamber behind the face of mold platen 64. Since the mold platens 62 and 64 are movable on the frame means 60, it is desirable that the conduits 72 and 76 be flexible to compensate for this movement.

From plenum chamber 70, the heating fluid medium is fed by one or more conduits 80 and 84 to mold platens 56 and 68, respectively. Magnetically operated valves 82 and 86 likewise control flow through conduits 80 and 84, respectively. As described below, a drain tube 88 is preferably located vertically below the mold apparatus 50 and is connected by a conduit 90, through valve 92 to the plenum chamber behind the face of mold platen 62. Similarly, conduit 94, through valve 96, is connected at a number of points to the plenum chamber behind the face of mold platen 56 and to the drain tube 88. Conduits 98 and 100, through valves 102 and 104, respectively, connect the plenum chambers behind the faces of mold platens 58 and 64, respectively, with the drain tube 88. The drain tube 88 is connected through a valve 106 to a large capacity vacuum pump schematically indicated at 108. A drain to atmosphere is provided for drain tube 88 through valve 110. Preferably, all of the valves used in the fluid handling system are magnetically operated to permit remote control operation thereof, preferably by means of a program. Also, all of the valves are of the on-off type so that they operate to be either fully open or fully closed.

With the mold apparatus as thus far described, the processing steps of the present invention will now be set forth.

With the mold platens 62 and 64 moved to their closed positions relative to their respective counterparts 56 and 58, the temperature of the mold cavities 52 and 54 is maintained at 200° to 275° F., if necessary by passing the fluid medium from one or the other of the plenum chambers 68 and 70 into the mold cavities. With the mold platens properly locked and sealed, valves 74, 82, 86, 78 and 110 are closed, while valves 92, 96, 102, 104 and 106 are open and the vacuum pump 108 is turned on to lower the pressure to subatmospheric, preferably to 8" to 9" Hg vacuum in the cavities 52 and 54. Shortly thereafter, the fill guns 66 are actuated to inject the partially expanded hot beads into the mold cavities 52 and 54 to fill the cavities. When the cavities have been filled, the fill guns 66 are turned off and valves 82, 86, 92, 104 and 106 are in their open positions while valves 96, 102, 74, 78 and 110 are placed in their closed positions. Thus, at this stage, the fluid medium from plenum chamber 70 will flow through conduits 80 and 84, through the faces of the respective mold platens 56 and 58 across the respective mold cavities 52 and 54 and out through the faces of the mold platens 62 and 64 through the conduits 90 and 100 to the vacuum pump 108. After a period of time, the flow direction of the heated fluid medium may be reversed.

To effect reversal when used, valves 80 and 84 are closed while valves 74 and 78 are opened and valves 92 and 104 are closed while valves 96 and 102 are opened whereby the fluid medium will flow from plenum chamber 68 through the faces of mold platens 62 and 64 across the cavities in the opposite direction and out through the orifices in the faces of the mold platens 56 and 58, through conduits 94 and 98 to the vacuum pump 108. With this arrangment, the possibility of creating a density gradient across the thickness of the molded article is substantially reduced so that a substantially more uniform and salable product will be obtained. In addition, as is well known, the partially expanded beads function as very efficient insulation barriers so that where the heating medium is only delivered from one side of a mold cavity and a very thick mold board is being made, substantially greater molding time would have to be employed to assure complete fusion of the beads throughout the mold cavity. However, with the method and apparatus of the present invention, the molding time is substantially reduced since the fluid medium saturates the partially expanded beads from opposite sides, thus assuring intimate and thorough heating of each of the beads.

Cooling of the product in the mold cavities is then accomplished by closing all of the valves from the plenum chambers 68 and 70 and opening valves 92, 96, 102, 104 and 106 with the vacuum pump on and valve 110 still closed to reduce the pressure to subatmospheric, preferably to about 10" Hg vacuum. The moisture and any gases in the mold cavities 52 and 54 will then be evacuated and the temperature in the cavities will also drop as the pressure drops. In this step the blowing agent concentration is reduced to less than 0.5 wt. %, preferably below 0.3 wt. %. Subsequently, then, valve 106 is closed and valve 110 opened to bring the mold cavities back to atmospheric pressure whereupon the mold platens are unlocked and opened, and the finished mold product is automatically ejected from each of the mold cavities.

The apparatus of the present invention, as described above, will rapidly perform a molding sequence chiefly by virtue of the fact that the molds can be rapidly filled with the partially expanded beads and then the beads can be uniformly heated to their fusion temperature to consolidate the beads in the finished article form. The molded product is then ejected from the mold cavities and is immediately ready for packaging and shipment to a customer.

While the invention has been specifically described using polystyrene beads containing n-pentane blowing agent, these are but preferred materials. Other foamable particulate polymer material which may be used includes other homopolymers and copolymers derived from vinyl monomers such as vinyl chloride, divinyl benzene, alpha-methylstyrene, nuclear dimethylstyrene, and vinyl naphthylene. In addition to the polystyrene homopolymers, copolymers of polystyrene with alpha-methylstyrene, divinyl benzene, butadiene, isobutylene and acrylonitrile having about 50% or more styrene are especially suitable. Useful blowing agents include other volatile aliphatic or cyclo-aliphatic hydrocarbons, generally having from 1 to 7 carbon atoms per molecule. These include methane, ethane, propane, butane, hexane, petroleum ethers, cyclopentane, cyclohexane, cyclopentadiene, and halogenated derivatives which have boiling points below the softening point of the polymers. Others include dichloroethylene, dichlorodifluoromethane, acetone, methanol, methyl acetate, ethyl acetate, methyl formate, ethyl formate, propionaldehyde, dipropyl ether. The expanding agent is generally present in amounts of from 3% to 15% by weight of polymers; from 5 to 8% is preferred.

To illustrate more fully the instant invention, attention is directed to the following examples.

EXAMPLE 1

Using the apparatus described above, 35 lb. of polystyrene beads containing 7% of n-pentane blowing agent are charged to the container 12. The jacket temperature is set for 225° F. and the beads preheated for 100 seconds, while air flows through the container at a rate of 100 cu.ft. per minute. During the preheating period, the pressure in the container is approximately atmospheric and the beads expand. Thereafter, the container is sealed and a vacuum of 23" Hg applied for 3 minutes. This reduces the n-pentane concentration to about 1% by weight. The pre-puffs obtained have a density of 1.60 lb./cu.ft. The pre-puff is subsequently molded into a board on a dual-platen board machine which is equipped with a platen size of 4'×8' and has a thickness of 2". The molding takes place at a steam pressure of 10 psig. Excellent fusion of the particles is obtained. The product is cooled under vacuum for 3 minutes. It has good dimensional stability and a blowing agent concentration of about 0.25%.

EXAMPLE 2

The process of Example 1 is repeated, except that after the preheating period, steam at a pressure of 100 psig is introduced into the container for a period of 6 seconds, during which the container is maintained at atmospheric pressure. The container is then placed under vacuum, exhausted for 30 seconds and the vacuum maintained for 1.5 minutes. This is sufficient to reduce the pentane content to about 1% by weight. The resulting product has an extremely low density of 0.75 lb./cu.ft. and is dry. This product is also molded as described in Example 1, except that steam pressure of only 8 psig is required to permeate the pre-puffs. The cooling time is reduced to 20 seconds. Excellent fusion of the beads is obtained and the product has outstanding dimensional stability. The reduced cooling time shows that the mold product is free of all moisture and blowing agent.

Having described the invention, it will be apparent to those skilled in the art that various modifications may be made thereto without departing from the spirit and scope of the invention as defined in the appended claims.

I claim:

1. A method of pre-expanding beads of synthetic thermoplastic resin material containing a blowing agent, comprising the steps of:
   (a) heating the beads in a chamber having an interior surface heated to about the fusion temperature of the beads and above the boiling point of the blowing agent;
   (b) continuously, at substantially atmospheric pressure, agitating the beads to prevent agglomeration while the beads absorb heat from the interior surface of the chamber, until said beads reach their softening point and expand in volume;
   (c) reducing the pressure in said chamber to extract a substantial portion of the gaseous blowing agent from the expanded beads so that the blowing agent content of the expanded beads is from about 0.75 to 2% by weight;
   (d) permitting the expanded beads to return to substantially atmospheric pressure.

2. A method of pre-expanding beads of polystyrene containing an n-pentane blowing agent comprising the steps of:
   (a) heating the beads in a chamber having an interior surface which is heated to a temperature of from 180° to 250° F.;
   (b) continuously, at substantially atmospheric pressure, agitating the beads to prevent agglomeration so that the beads absorb heat from the interior surface of the chamber, soften and expand in volume;
   (c) reducing the pressure in said chamber to from 10" to 25" Hg to reduce the weight percent of the n-pentane in the polystyrene to about 0.75% to 2%;
   (d) permitting the expanded beads to return to substantially atmospheric pressure.

3. A method of pre-expanding beads of synthetic thermoplastic resin material containing a blowing agent, comprising the steps of:
   (a) heating the beads in a chamber having an interior surface heated to about the fusion temperature of the beads and above the boiling point of the blowing agent;
   (b) continuously agitating the beads to prevent agglomeration while the beads absorb heat from the interior surface of the chamber, until said beads reach their softening point and expand in volume;
   (c) introducing steam at a temperature above the temperature of said expanded beads into direct contact with said expanded beads so as to further heat and expand said expanded beads;
   (d) reducing the pressure in said chamber to extract a substantial portion of the gaseous blowing agent from the expanded beads so that the blowing agent content of the expanded beads is from about 0.75 to 2% by weight;
   (e) permitting the expanded beads to return to substantially atmospheric pressure.

4. A method of pre-expanding beads of synthetic thermoplastic resin material containing a blowing agent, comprising the steps of:
   (a) heating the beads in a chamber having an interior surface heated to about the fusion temperature of the beads and above the boiling point of the blowing agent;
   (b) continuously, at substantially atmospheric pressure, agitating the beads to prevent agglomeration while the beads absorb heat from the interior surface of the chamber, while passing a non-flammable gas through said chamber, until said beads reach their softening point and expand in volume, said non-flammable gas serving to sweep out the volatilized blowing agent which escapes during the heating and expanding step;

(c) reducing the pressure in said chamber to extract a substantial portion of the gaseous blowing agent from the expanded beads so that the blowing agent content of the expanded beads is from about 0.75 to 2% by weight;

(d) permitting the expanded beads to return to substantially atmospheric pressure.

5. A method for pre-expanding beads of synthetic thermoplastic resin material containing a blowing agent, comprising the steps of:

(a) heating the beads in a chamber having an interior surface heated to about the fusion temperature of the beads and above the boiling point of the blowing agent;

(b) continuously agitating the beads to prevent agglomeration while the beads absorb heat from the interior surface of the chamber, while passing a non-flammable gas through said chamber, until said beads reach their softening point and expand in volume, said non-flammable gas serving to sweep out the volatilized blowing agent which escapes during the heating and expanding step;

(c) introducing steam at a temperature above the temperature of said expanded beads into direct contact with said expanded beads so as to further heat and expand said expanded beads;

(d) reducing the pressure in said chamber to extract a substantial portion of the gaseous blowing agent from the expanded beads so that the blowing agent content of the expanded beads is from about 0.75 to 2% by weight;

(e) permitting the expanded beads to return to substantially atmospheric pressure.

6. A method of forming an expanded synthetic thermoplastic resin article from a synthetic thermoplastic resin material containing a blowing agent, comprising the steps of:

(a) heating the beads in a chamber having an interior surface heated to about the fusion temperature of the beads and above the boiling point of the blowing agent;

(b) continuously, at substantially atmospheric pressure, agitating the beads to prevent agglomeration while the beads absorb heat from the interior surface of the chamber, until said beads reach their softening point and expand in volume;

(c) reducing the pressure in said chamber to extract a substantial portion of the gaseous blowing agent from the expanded beads so that the blowing agent content of the expanded beads is from about 0.75 to 2% by weight;

(d) permitting the expanded beads to return to substantially atmospheric pressure;

(e) conveying the expanded beads to a mold cavity;

(f) introducing a heated fluid medium from one side of the mold cavity, while maintaining a negative pressure on the opposite side of the mold cavity to further expand the beads and until the beads are completely fused;

(g) discontinuing the supply of heated fluid medium after the fusion is completed and maintaining a negative pressure on the mold cavity to remove residual blowing agent and moisture;

(h) returning the mold cavity to atmospheric pressure after said residual moisture and blowing agent are removed;

(i) removing the thus formed article from the mold cavity.

7. A method of forming an expanded polystyrene article from polystyrene beads containing an n-pentane blowing agent comprising the steps of:

(a) heating the beads in a chamber having an interior surface which is heated to a temperature of from 180° to 250° F.;

(b) continuously, at substantially atmospheric pressure, agitating the beads to prevent agglomeration so that the beads absorb heat from the interior surface of the chamber, soften and expand in volume;

(c) reducing the pressure in said chamber to from 10" to 25" Hg to reduce the weight percent of the n-pentane in the polystyrene to about 0.75% to 2%;

(d) permitting the expanded beads to return to substantially atmospheric pressure;

(e) conveying the expanded beads to a mold cavity;

(f) introducing a heated fluid medium from one side of the mold cavity, while maintaining a negative pressure on the opposite side of the mold cavity to further expand the beads and until the beads are completely fused;

(g) discontinuing the supply to heated fluid medium after the fusion is completed and maintaining a negative pressure on the mold cavity to remove residual blowing agent and moisture.

(h) returning the mold cavity to atmospheric pressure after said residual moisture and blowing agent are removed;

(i) removing the thus formed article from the mold cavity.

8. A method of forming an expanded synthetic thermoplastic resin article from a synthetic thermoplastic resin material containing a blowing agent, comprising the steps of:

(a) heating the beads in a chamber having an interior surface heated to about the fusion temperature of the beads and above the boiling point of the blowing agent;

(b) continuously agitating the beads to prevent agglomeration while the beads absorb heat from the interior surface of the chamber, until said beads reach their softening point and expand in volume;

(c) introducing steam at a temperature above the temperature of said expanded beads into direct contact with said expanded beads so as to further heat and expand said expanded beads;

(d) reducing the pressure in said chamber to extract a substantial portion of the gaseous blowing agent from the expanded beads so that the blowing agent content of the expanded beads is from about 0.75 to 2% by weight;

(e) permitting the expanded beads to return to substantially atmospheric pressure;

(f) conveying the expanded beads to a mold cavity;

(g) introducing a heated fluid medium from one side of the mold cavity, while maintaining a negative pressure on the opposite side of the mold cavity to further expand the beads and until the beads are completely fused;

(h) discontinuing the supply of heated fluid medium after the fusion is completed and maintaining a negative pressure on the mold cavity to remove residual blowing agent and moisture;

(i) returning the mold cavity to atmospheric pressure after said residual moisture and blowing agent are removed;

(j) removing the thus formed article from the mold cavity.

9. A method of forming an expanded synthetic thermoplastic resin article from a synthetic thermoplastic resin material containing a blowing agent, comprising the steps of:

(a) heating the beads in a chamber having an interior surface heated to about the fusion temperature of the beads and above the boiling point of the blowing agent;

(b) continuously, at substantially atmospheric pressure, agitating the beads to prevent agglomeration while the beads absorb heat from the interior surface of the chamber, while passing a non-flammable gas through said chamber, until said beads reach their softening point and expand in volume, said non-flammable gas serving to sweep out the volatilized blowing agent which escapes during the heating and expanding step;

(c) reducing the pressure in said chamber to extract a substantial portion of the gaseous blowing agent from the expanded beads so that the blowing agent content of the expanded beads is from about 0.75 to 2% by weight;

(d) permitting the expanded beads to return to substantially atmospheric pressure;

(e) conveying the expanded beads to a mold cavity;

(f) introducing a heated fluid medium from one side of the mold cavity, while maintaining a negative pressure on the opposite side of the mold cavity to further expand the beads and until the beads are completely fused;

(g) discontinuing the supply of heated fluid medium after the fusion is completed and maintaining a negative pressure on the mold cavity to remove residual blowing agent and moisture;

(h) returning the mold cavity to atmospheric pressure after said residual moisture and blowing agent are removed;

(i) removing the thus formed article from the mold cavity.

10. A method of forming an expanded synthetic thermoplastic resin article from a synthetic thermoplastic resin material containing a blowing agent, comprising the steps of:

(a) heating the beads in a chamber having an interior surface heated to about the fusion temperature of the beads and above the boiling point of the blowing agent;

(b) continuously agitating the beads to prevent agglomeration while the beads absorb heat from the interior surface of the chamber, while passing a non-flammable gas through said chamber, until said beads reach their softening point and expand in volume, said non-flammable gas serving to sweep out the volatilized blowing agent which escapes during the heating and expanding step;

(c) introducing steam at a temperature above the temperature of said expanded beads into direct contact with said expanded beads so as to further heat and expand said expanded beads;

(d) reducing the pressure in said chamber to extract a substantial portion of the gaseous blowing agent from the expanded beads so that the blowing agent content of the expanded beads is from about 0.75 to 2% by weight;

(a) permitting the expanded beads to return to substantially atmospheric pressure;

(f) conveying the expanded beads to a mold cavity;

(g) introducing a heated fluid medium from one side of the mold cavity, while maintaining a negative pressure on the opposite side of the mold cavity to further expand the beads and until the beads are completely fused;

(h) discontinuing the supply of heated fluid medium after the fusion is completed and maintaining a negative pressure on the mold cavity to remove residual blowing agent and moisture;

(i) returning the mold cavity to atmospheric pressure after said residual moisture and blowing agent are removed;

(j) removing the thus formed article from the mold cavity.

11. The method of claim 6, 7, 8, 9 or 10 wherein the flow of the heated fluid medium through the mold cavity is reversed by feeding the heated fluid medium from the other side of the mold while maintaining a negative pressure on said one side of the mold cavity.

12. The method of claim 1, 2, 4, 6, 7 or 9 wherein steam at a temperature above the temperature of the expanded beads is introduced into direct contact with said expanded beads at the end of step (b) so as to further heat and expand said expanded beads.

13. The method of claim 1, 3, 4, 5, 6, 8, 9 or 10 wherein the thermoplastic resin material is polystyrene and the blowing agent is n-pentane.

* * * * *

UNITED STATES PATENT AND TRADEMARK OFFICE
CERTIFICATE OF CORRECTION

PATENT NO. : 4,272,469
DATED      : June 9, 1981
INVENTOR(S) : STUART B. SMITH

It is certified that error appears in the above—identified patent and that said Letters Patent are hereby corrected as shown below:

In the heading of the patent for "Assignee:

Integrated Insulation Systems,

Inc., Decatur, Ga."

read -- Assignee: CELLOFOAM A.G., Lucerne,

Switzerland -- column 14, line 22 for "(a)" read -- (e) --

Signed and Sealed this

Twenty-seventh Day of October 1981

[SEAL]

Attest:

GERALD J. MOSSINGHOFF

Attesting Officer      Commissioner of Patents and Trademarks